April 20, 1926.  1,581,777
R. BEYNON
METHOD OF MANUFACTURE OF RUBBER WINDOW GLASS CHANNEL
Filed July 20, 1923   2 Sheets-Sheet 2
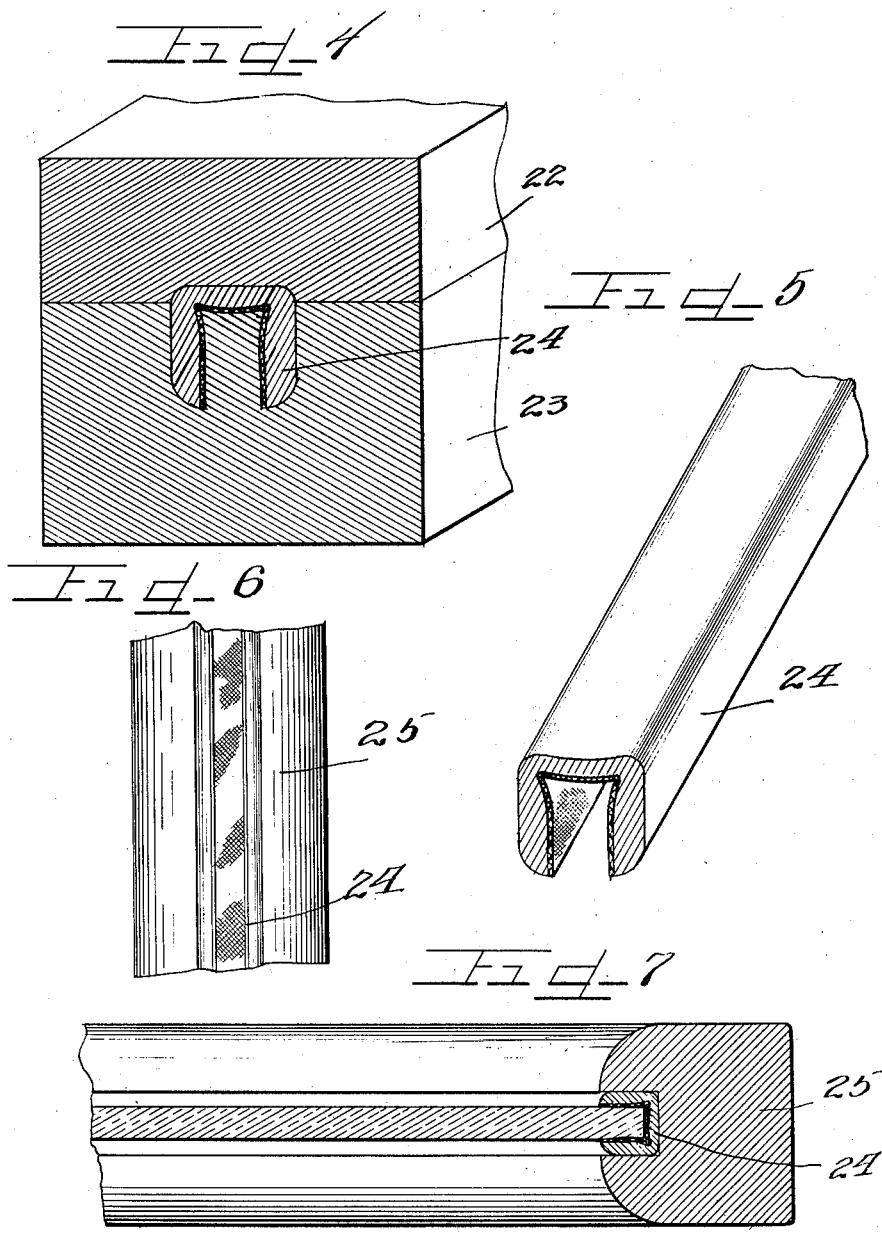

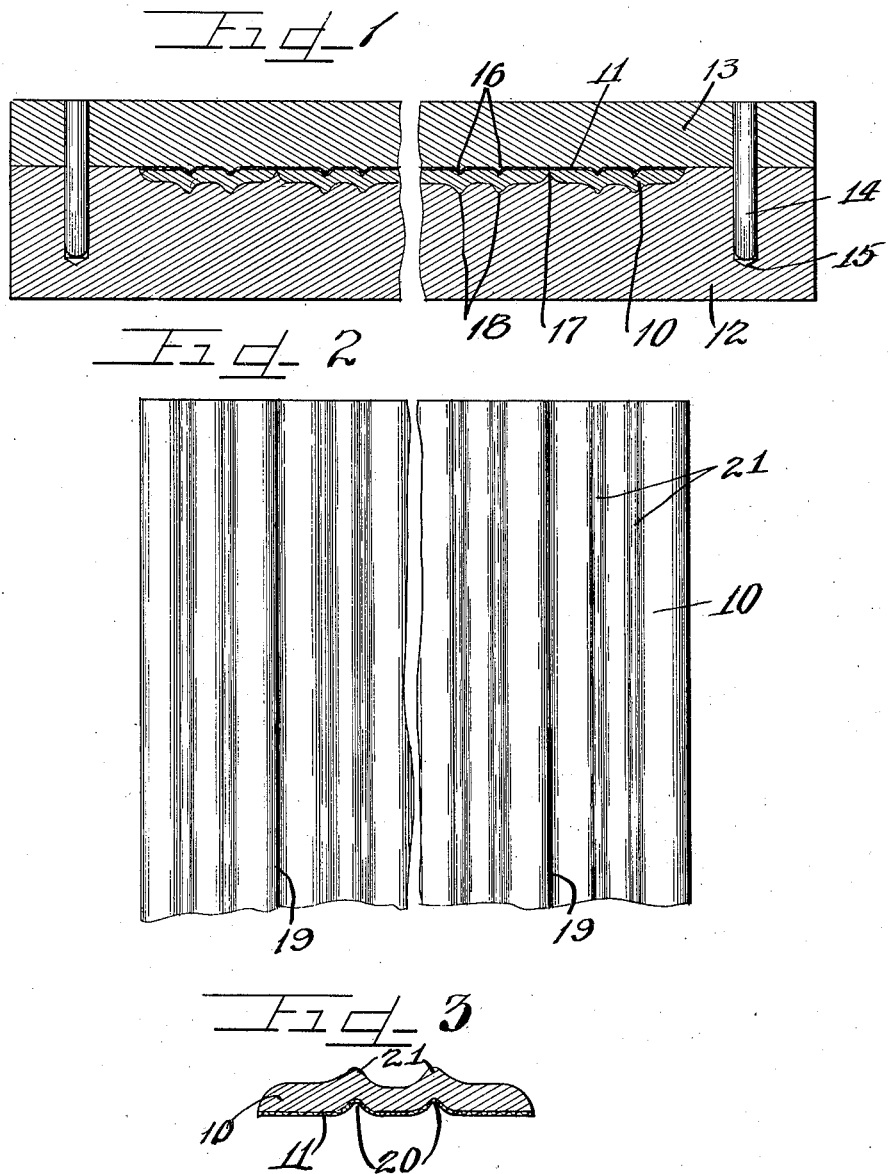

Patented Apr. 20, 1926.

1,581,777

UNITED STATES PATENT OFFICE.

REES BEYNON, OF CHICAGO, ILLINOIS, ASSIGNOR TO DRYDEN RUBBER COMPANY, OF CHICAGO, ILLINOIS, A CORPORATION OF ILLINOIS.

METHOD OF MANUFACTURE OF RUBBER WINDOW-GLASS CHANNEL.

Application filed July 20, 1923. Serial No. 652,786.

*To all whom it may concern:*

Be it known that I, REES BEYNON, a citizen of the United States, and a resident of the city of Chicago, in the county of Cook and State of Illinois, have invented certain new and useful Improvements in a Method of Manufacture of Rubber Window-Glass Channel; and I do hereby declare that the following is a full, clear, and exact description of the same, reference being had to the accompanying drawings, and to the numerals of reference marked thereon, which form a part of this specification.

This invention relates to the manufacture of rubber window glass channel. In automobiles it is customary to provide sliding glass windows without a sash or frame attached to and moving with the glass pane.

If the glass pane slides in direct contact with grooves in a wooden or metallic frame it is apt to rattle. To prevent this it has been suggested to insert a ruber channel member. With such a member, however, the glass pane is apt to stick. To obviate this objection it has also been suggested to incorporate a layer of fabric into the inner surface of the channel. Great difficulty has been experienced in applying a layer of fabric to the interior of a rubber channel. It is very hard to get the fabric into proper position and to secure it in such position. In pushing the fabric into position it is apt to wrinkle along the side portions of the channel and draw a part of the rubber with it giving an unsatisfactory, irregular and unsightly product.

The principal object, therefore, of the present invention it is provide a simple and satisfactory method for making fabric lined rubber channels.

Other and further important objects of this invention will be apparent from the disclosures in the accompanying drawings and specification.

The invention (in a preferred form) is illustrated in the drawings and hereinafter more fully described.

On the drawings:

Figure 1 is a cross-section through the molds used in the first operation in the manufacture of the channel.

Figure 2 is a plan view of the product after the first operation illustrating the separation into individual strips.

Figure 3 is a cross-section through one of the strips after separation.

Figure 4 is a sectional view of the molds used in the final operation.

Figure 5 is a view showing the completed channel.

Figure 6 is an edge view of a window frame with the channel in position.

Figure 7 is a sectional view of the same.

As shown on the drawings:

A sheet of unvulcanized rubber 10 and a sheet of fabric 11 are placed between a pair of molds 12 and 13. The upper mold 13 is provided with pins 14 adapted to enter apertures 15 in the lower mold and so hold them in registry with each other.

The upper mold is provided with a series of longitudinal ridges 16 adapted to form lines of fold in the completed strips.

The lower mold is recessed to receive the rubber except for ridges 17 spaced apart the width of the strip desired. Further grooves 18 are formed in the recessed portion opposite the ridges 16. Sufficient heat and pressure are applied to partially vulcanize the rubber and then the sheet is removed.

The next step is to run the sheet over the knives 19 to separate the sheets into strips along the lines formed by the ridges 17. The strips so separated have the form shown in Figure 3 having grooves 20 on the fabric side and ridges 21 on the opposite side registering with the grooves.

The strips are then bent or folded along the lines of the grooves to form a channel. It will be evident that the ridges 21 serve to fill out the outer corners of the channel to be formed with sharp corners.

After bending or folding the strip into channel form it is placed between a pair of molds 22 and 23 and subjected to heat and pressure to vulcanize and shape the same fully. The channel 24 is then ready for insertion in the groove of a window frame 25.

I am aware that numerous details of construction may be varied through a wide range without departing from the principles of this invention, and I therefore do not purpose limiting the patent granted otherwise than necessitated by the prior art.

I claim as my invention:

1. A method of making rubber window glass channel including compressing together and partially vulcanizing a sheet of rubber and a sheet of fabric between two molds, one of said molds having ridges adapted to subdivide the sheet into strips and the other having ridges adapted to produce lines of fold in such strips, the first mold also having grooves opposite to the ridges on the second mold, then cutting the sheet along the lines of subdivision and finally bending the strip along such lines of fold into channel form and completing the vulcanization.

2. A method of making rubber window glass channel including compressing together a strip of rubber and a strip of fabric, bending the composite strip into channel form of angular cross-section with the fabric on the inner side and vulcanizing to make the channel form permanent.

3. A method of making rubber window glass channel including compressing together and partially vulcanizing a sheet of rubber and a sheet of fabric between two molds, one of said molds having ridges adapted to subdivide the sheet into strips and the other having ridges adapted to produce lines of fold in such strips, then cutting the sheet along the lines of subdivision and finally bending the strip along such lines of fold into channel form and completing the vulcanization.

4. A method of making rubber window glass channel including compressing together and partially vulcanizing a strip of rubber and a strip of fabric between two molds, one of said molds having ridges adapted to produce lines of fold in such strips, and then bending the strip along such lines to fold into channel form and completing the vulcanization.

5. A method of making rubber window glass channel including compressing together to form parallel longitudinal ridges on one side and corresponding parallel depressions on the other side and partially vulcanizing a strip of rubber and a strip of fabric, bending the strip into channel form and completing the vulcanization.

6. A method of making rubber window glass channel including compressing together a strip of rubber and a strip of fabric to form parallel longitudinal ridges on one side and corresponding parallel depressions on the other side, bending the composite strip into channel form and vulcanizing to make the channel form permanent.

In testimony whereof I have hereunto subscribed my name.

REES BEYNON.